(12) United States Patent
Johnson

(10) Patent No.: US 10,992,535 B2
(45) Date of Patent: *Apr. 27, 2021

(54) HYBRID CLOUD INTEGRATION FABRIC AND ONTOLOGY FOR INTEGRATION OF DATA, APPLICATIONS, AND INFORMATION TECHNOLOGY INFRASTRUCTURE

(71) Applicant: PRIVOPS LLC, Alpharetta, GA (US)

(72) Inventor: Tyler James Johnson, Alpharetta, GA (US)

(73) Assignee: Privops LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/680,079

(22) Filed: Nov. 11, 2019

(65) Prior Publication Data

US 2020/0084106 A1    Mar. 12, 2020

Related U.S. Application Data

(63) Continuation of application No. 15/381,686, filed on Dec. 16, 2016, now Pat. No. 10,491,477.

(Continued)

(51) Int. Cl.
*H04L 12/24*     (2006.01)
*H04L 29/08*     (2006.01)

(52) U.S. Cl.
CPC .......... *H04L 41/0893* (2013.01); *H04L 41/12* (2013.01); *H04L 41/20* (2013.01); *H04L 41/5009* (2013.01); *H04L 67/10* (2013.01)

(58) Field of Classification Search
CPC .......... H04L 41/12; H04L 67/10; H04L 41/20
See application file for complete search history.

(56) References Cited

U.S. PATENT DOCUMENTS

| 8,832,130 | B2 * | 9/2014 | Doddavula | G06F 9/5083 |
| | | | | 707/759 |
| 8,918,449 | B2 * | 12/2014 | Patel | G06F 9/547 |
| | | | | 709/202 |

(Continued)

OTHER PUBLICATIONS

Non-final Office Action issued in U.S. Appl. No. 15/381,686, dated Nov. 14, 2018.

*Primary Examiner* — Lashonda T Jacobs
(74) *Attorney, Agent, or Firm* — Morris, Manning & Martin, LLP; Daniel E. Sineway, Esq.

(57) ABSTRACT

A method performed by a processor in a hybrid cloud environment, the method including: specifying at least one service provider zone associated with a resource or a service of a service provider, the service provider zone including a first management interface node corresponding to the service provider; specifying at least one data center zone associated with a set of services or resources located near one another, the data center zone including a second management interface node corresponding to the set of services or resources; receiving, by the first management interface node, information from the resource or service associated with the at least one service provider zone; translating, by the first management interface node, the information from the resource or service to a format understandable by the second interface node to create first-level translated information; and transmitting the first-level translated information from the first interface node to the second interface node.

18 Claims, 7 Drawing Sheets

Related U.S. Application Data

(60) Provisional application No. 62/269,861, filed on Dec. 18, 2015.

(56) References Cited

U.S. PATENT DOCUMENTS

| | | | | |
|---|---|---|---|---|
| 2012/0204187 A1* | 8/2012 | Breiter | ............... | G06F 9/5072 |
| | | | | 718/105 |
| 2014/0289791 A1* | 9/2014 | Acharya | ............ | H04L 61/2575 |
| | | | | 726/1 |
| 2016/0028688 A1* | 1/2016 | Chizhov | ............... | H04L 67/141 |
| | | | | 726/12 |
| 2016/0057027 A1* | 2/2016 | Hinrichs | ............ | H04L 41/5025 |
| | | | | 709/224 |
| 2017/0034274 A1* | 2/2017 | Hanney | ............... | H04L 67/1097 |
| 2017/0063687 A1* | 3/2017 | Maskalik | ................ | H04L 45/02 |
| 2017/0099362 A1* | 4/2017 | Almond | ................. | H04L 67/26 |
| 2017/0213174 A1* | 7/2017 | Deshpande | ........ | G06Q 10/0633 |
| 2018/0322168 A1* | 11/2018 | Levine | ................ | G06F 16/2448 |
| 2019/0052643 A1* | 2/2019 | Doshi | ...................... | G06N 5/04 |

* cited by examiner

HYBRID CLOUD INTEGRATION FABRIC AND ONTOLOGY FOR INTEGRATION OF DATA, APPLICATIONS, AND INFORMATION TECHNOLOGY INFRASTRUCTURE

CROSS-REFERENCE TO RELATED APPLICATION

This application is a continuation application that claims priority to and benefit of U.S. Pat. No. 10,491,477, filed Dec. 16, 2016, entitled "HYBRID CLOUD INTEGRATION FABRIC AND ONTOLOGY FOR INTEGRATION OF DATA, APPLICATIONS, AND INFORMATION TECHNOLOGY INFRASTRUCTURE,", which claims the benefit of and priority to U.S. Patent Application No. 62/269,861, filed Dec. 18, 2015, entitled "A HYBRID CLOUD INTEGRATION FABRIC FOR ON-PREMISE AND OFF-PREMISE COMPUTING ENVIRONMENTS," each of which are hereby incorporated by reference in their entireties as if fully set forth below.

FIELD

The present disclosure is in the technical field of Information Technology (IT). More particularly, aspects of the present disclosure relate to systems, methods, computer science ontologies and apparatuses that integrate software applications and manage both cloud computing IT services and traditional on-premise application, infrastructure and data IT systems.

BACKGROUND

There has been a proliferation of methods of information technology consumption as service providers move to provide disaggregated IT services in the form of web services (e.g. application programming interfaces (APIs)), platform services (e.g. Platform as a service (PaaS)), infrastructure services (e.g. Infrastructure as a service (IaaS)), software subscription services (e.g. Software as a service (SaaS)), and service management (e.g. IT service management coordination and/or integration software). Additionally, organizations other than traditional IT service providers have begun offering access to internal IT system resources through the aforementioned methods and others.

Because of the complexity created by the proliferation of disaggregated IT services, many companies and other types of organizations are unable to efficiently connect new IT services to each other as well as to legacy IT systems where, in some cases, the bulk of an organization's data resides. This limits their ability to innovate. Traditional methods of application and service integration include custom system integration via professional services. and/or integration platforms. These approaches fall short because they only cover a subset of service endpoints and/or lack the scalability, modularity, and extensibility required for modern IT use cases driven by technological advances in cloud computing, social media, predictive analytics, mobile device proliferation, the Internet of Things (IoT), machine learning and other emerging technologies.

SUMMARY

A method, system, apparatus and supporting ontology for a hybrid cloud integration fabric (HCIF) may be provided. According to some aspects of the present disclosure, the HCIF can provide an extensible programming framework and data model (ontology) for integration, orchestration and management of one or more heterogeneous cloud services and on-premise environments. Some embodiments can include at least one database, at least one compute engine and at least one interface. Operating on this architecture are additional aspects of the present disclosure that can include a plurality of standardized programmable constructs and a data model that includes metadata (e.g. functions, policies and resources), and data. Components provided by aspects of the present disclosure can enable businesses, developers, end-users, and administrators to structure and use unified methods to operate, manage, integrate, automate and consume all of their heterogeneous IT systems and components through a single fabric and set of workflows and processes.

Many benefits may be recognized through various example embodiments. These benefits can include the ability to programmatically combine existing applications, applications designed to run on public and/or private cloud services, web services, application program interfaces (APIs), data services and other IT services into hybrid applications. Additional benefits can include deployment of a highly resilient hybrid cloud architecture distributed across multiple service providers and locations and the development and use of data structures that greatly facilitate the task of service management of hybrid cloud applications data, and infrastructures (e.g. computers, data storage, network components, change requests, support requests, capacity management, etc.).

According to some embodiments, there is provided a method performed by a processor in a hybrid cloud environment, the method including: specifying at least one service provider zone associated with a resource or a service of a service provider, the service provider zone including a first management interface node corresponding to the service provider; specifying at least one data center zone associated with a set of services or resources located near one another, the data center zone including a second management interface node corresponding to the set of services or resources; receiving, by the first management interface node, information from the resource or service associated with the at least one service provider zone; translating, by the first management interface node, the information from the resource or service to a format understandable by the second interface node to create first-level translated information; and transmitting the first-level translated information from the first interface node to the second interface node.

The method may further include: receiving, by the second interface node, the first-level translated information; translating, by the second interface node, the first-level translated information to a format understandable by the set of services or resources associated with the at least one data center zone to create second-level translated information; and transmitting the second-level translated information to the set of services or resources associated with the at least one data center zone.

The method may further include: programmatically storing metadata corresponding to all the resources and services of the hybrid cloud environment; and facilitating management of the hybrid cloud environment based on the stored metadata.

The information may include an instruction from the resource or service associated with the at least one service provider zone, and the translating by the first management interface node may include: translating the instruction from the resource or service to a format understandable by the second interface node; and combining the translated instruction with additional data to create the first-level translated information.

The method may further include: maintaining a connection between the first management interface node manager and at least one security service and device; and managing security of the first management interface node through the connection.

The method may further include: receiving, by a change engine, a change event; extracting, by the change engine, one or more policies related to the change event and attributes of operating groups impacted by the change event; loading, by the change engine, resource attributes; building, by the change engine, a policy model; generating, by the change engine, an optimized application configuration based on the policy model, attributes of the operating groups, and resource attributes; and updating, by the change engine, the one or more policies, attributes, and connections between operating groups.

The method may further include: optimizing latency between metadata and the resources and services of the hybrid cloud environment based on application policies.

According to some embodiments, there is provided a computer apparatus including: a processor; and a memory, having stored thereon computer program code that, when executed by the processor, instructs the processor to implement a hybrid cloud integration fabric (HCIF) within a hybrid cloud environment. The HCIF may include: at least one service provider zone; at least one data center zone; and a management interface node located within each of the at least one server provider zone and the at least one data center zone. Each management interface node may be configured to: communicate with a resource or service within the hybrid cloud environment; communicate with at least one other management interface nodes; and translate information between the resource or service and the at least one other management interface nodes.

Each management interface node may be further configured to: programmatically store metadata corresponding to all the resources and services of the hybrid cloud environment; and facilitate management of the hybrid cloud environment.

Each management interface node may include: a management data store; an integration appliance configured to: receive instructions from the resource or service; translate the instruction and combine the instruction with additional data; and transmit the translated instruction; an internode manager configured to manage connections between the management interface node and another management interface node; and a fabric manager configured to control configuration of the management Interface node.

The fabric manager may be configured to manage security of the management interface node through connection with security services and devices.

The fabric manager may be configured to optimize latency between metadata stored in the management data store and resources and services based on application policies.

The management data store may include a plurality of data nodes including: operating group information correspond to resources and services associated with a software application; data center group information corresponding to resource and service locations; policy information corresponding to policies within the hybrid cloud environment; resource information corresponding to attributes of resources and services within the hybrid cloud environment; and execution information comprising executable program code.

According to some embodiments, there may be provided a non-transitory computer readable medium having stored thereon computer program code that includes instructions to implement a hybrid cloud integration fabric (HCIF) within a hybrid cloud environment. The HCIF may include: at least one service provider zone; at least one data center zone; and a management interface node located within each of the at least one server provider zone and the at least one data center zone. Each management interface node may be configured to: communicate with a resource or service within the hybrid cloud environment; communicate with at least one other management interface nodes; and translate information between the resource or service and the at least one other management interface nodes.

Each management interface node may be further configured to: programmatically store metadata corresponding to all the resources and services of the hybrid cloud environment; and facilitate management of the hybrid cloud environment.

Each management interface node may include: a management data store; an integration appliance configured to: receive instructions from the resource or service; translate the instruction and combine the instruction with additional data; and transmit the translated instruction; an internode manager configured to manage connections between the management interface node and another management interface node; and a fabric manager configured to control configuration of the management interface node.

The fabric manager may be configured to manage security of the management interface node through connection with security services and devices.

The fabric manager may be configured to optimize latency between metadata stored in the management data store and resources and services based on application policies.

The management data store may include a plurality of data nodes including: operating group information correspond to resources and services associated with a software application; data center group information corresponding to resource and service locations; policy information corresponding to policies within the hybrid cloud environment; resource information corresponding to attributes of resources and services within the hybrid cloud environment; and execution information comprising executable program code.

DETAILED DESCRIPTION

Figure 1:
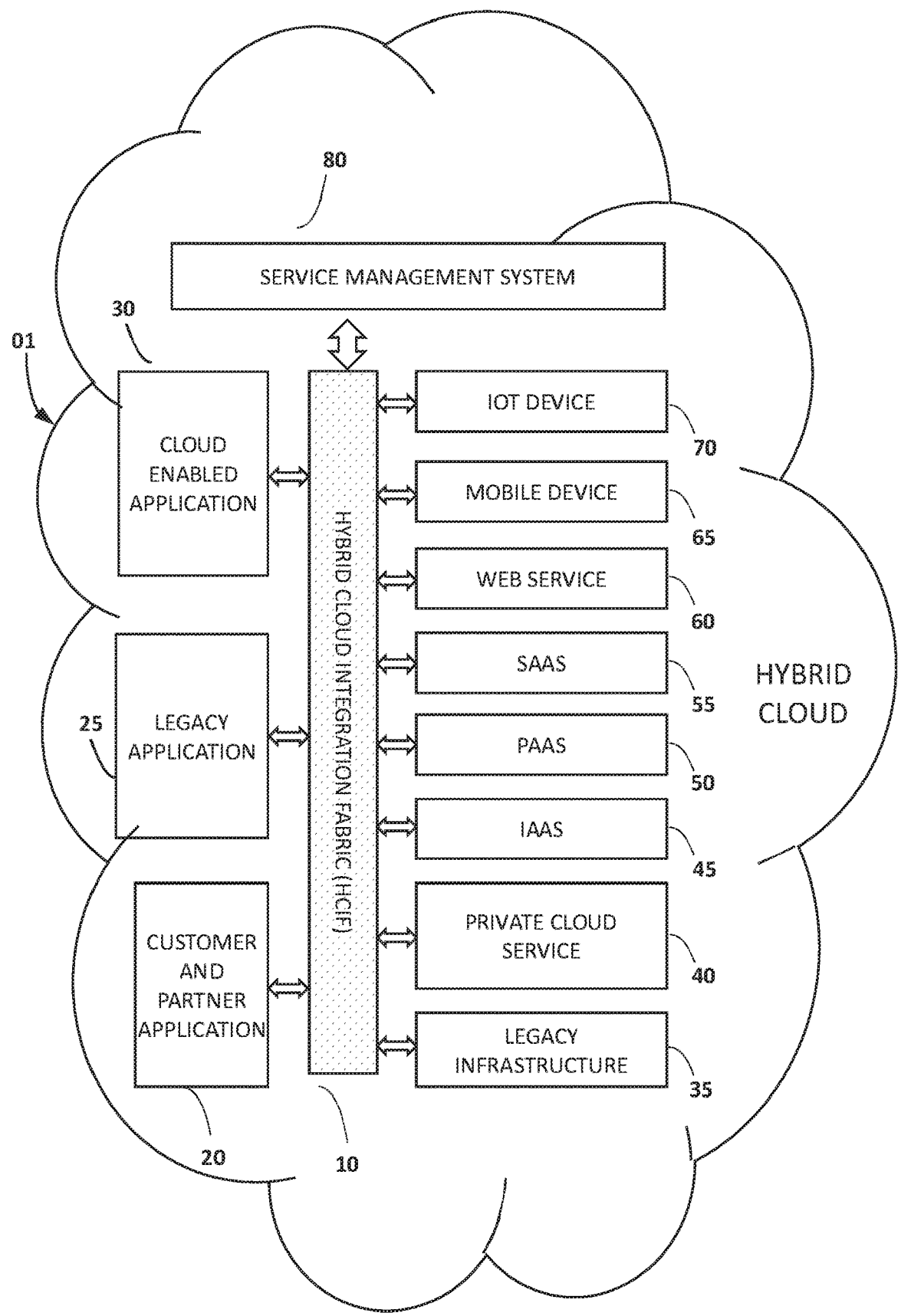
FIG. 1 is a block diagram illustrating an example a hybrid cloud according to one or more example embodiments.

The present disclosure can be understood more readily by reference to the following detailed description of one or more exemplary embodiments and the examples included herein. It is to be understood that embodiments are not limited to the example embodiments described within this disclosure. Numerous modifications and variations therein will be apparent to those skilled in the art and remain within the scope of the disclosure. It is also to be understood that the terminology used herein is for describing specific exemplary embodiments only and is not intended to be limiting. Some exemplary embodiments of the disclosed technology will be described more fully hereinafter with reference to the accompanying drawings. The disclosed technology might, however, be embodied in many different forms and should not be construed as limited to the exemplary embodiments set forth herein.

In the following description, numerous specific details are set forth. However, it is to be understood that embodiments of the disclosed technology may be practiced without these specific details. In other instances, well-known methods, structures, and techniques have not been shown in detail in order to avoid obscuring an understanding of this description. References to "one embodiment," "an embodiment," "example embodiment," "some embodiments," "certain embodiments," "various embodiments," etc., indicate that the exemplary embodiment(s) of the disclosed technology so described may include a particular feature, structure, or characteristic, but not that every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context dearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third,", etc., to describe a common object, merely indicates that different instances of like objects are being referred to, and are not intended to imply that the objects so described must be in a given sequence, either temporally, spatially, in ranking, or in any other manner.

Further, in describing one or more exemplary embodiments, certain terminology will be used to for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, exemplary embodiments are explained hereinafter with reference to their implementation in illustrative embodiments. Such illustrative embodiments are not intended to be limiting.

The materials described hereinafter as making up the various elements of the embodiments of the present disclosure are intended to be illustrative only and not restrictive. Many suitable materials that would perform a same or a similar function as the materials described herein are intended to be embraced within the scope of the exemplary embodiments. Such other materials not described herein can include, but are not limited to, materials that are developed after the time of the development of the invention.

Embodiments of the disclosed technology include an extended-life power source and power management system for use with an asset tracking system or an asset sensing system. The tracking and sensing hardware platforms can be used within various applications, such as, as non-limiting examples, dry van trailers, flatbed trailers, domestic intermodal containers, ocean-going containers, and ocean and intermodal container chassis. In various embodiments, the power management system may adjust operational dynamics of the asset tracking system and the asset sensing system. In some embodiments, components of the power source and power management system may be monitored.

Throughout this disclosure, certain exemplary embodiments are described in exemplary fashion in relation to asset tracking systems. However, embodiments of the disclosed technology are not necessarily so limited. In some embodiments, the disclosed technology may be effective in other asset tracking and sensing systems, as well as other systems requiring long-life power sources and power management.

Referring now to FIG. 1, there is shown a hybrid cloud 01 that can encompass a heterogeneous set of IT resources and services. Taken together, the hybrid cloud 01 can represent the entirety of the IT systems, processes, methods and infrastructure of an organization or a plurality of organizations where there is a need or opportunity to create value by connecting a set of IT resources and services together. In this particular embodiment, the organization's IT resources and services represented by the hybrid cloud 01 could be a single group of software applications and related IT resources and services, the IT resources and services consumed by a company division or the IT resources and services of an entire company, a group of companies, a public sector governmental agency or entire government, a charitable or social organization or set of organization, or an ecosystem representing the entire value chain of an industry or set of industries.

The hybrid cloud 01 in an example embodiment is composed of a set of resources and services surrounding a hybrid cloud integration fabric (HCIF) 10. In some embodiments, the HCIF 10 provides an ontology containing a data model, programming model and infrastructure model that defines types, properties, and interrelationships between program, data and physical elements. The HCIF 10 may be programmatically connected via command line interface (CU), shell scripts, APIs, queries, or other electronic methods to one or more of a customer and partner application 20, a legacy application 25, a cloud enabled application 30, a legacy infrastructure 35, a private cloud service 40, an infrastructure as a service (IAAS) 45, a platform as a service (PAAS) 50, a software as a service (SAAS) 55, a web service 60, a mobile device 65, and an Internet of things device (IOT device) 70. The HCIF 10 may also connect an IT service management system 80 consisting of one or more service management sub-systems. By providing the HCIF 10, organizations may be able to quickly utilize new combinations of disparate technology resources to create new applications that service new and/or enhanced use cases. Further, changes, updates, additions, and deletions to individual resources and services may be minimally disruptive to other resources and services and this may facilitate migrations to other technologies and minimize lock-in to a technology, service provider and/or vendor. In addition, while FIG. 1 shows each resource and service connected to each other resource and service through the HCIF 10, two or more resources and services may be connected to each other directly as well.

The customer and partner application 20 may include one or more standard software applications running on computer servers, either in a customer or partner organization's premises (e.g. data center) or on servers located in a service provider's facility (e.g. managed hosting provider, managed colocation provider, etc.). The standard software applications referred to by the customer and partner application 20 may be used to perform standard business or other activities, (e.g. customer relationship management, document management, supply chain management, social media, collaboration, etc.), and may be managed by the related customers and partners or by one or more service providers on behalf of the related customers and partners and can be custom developed software applications or applications developed and sold by independent software vendors (ISVs).

The legacy application 25 may be identical to the customer and partner applications 25 except that the legacy application 20 may refer to one or more standard software applications running on computer servers, either in an organization's premises (e.g. data center) or on servers directly available to the organization located in a service provider's facility (e.g. managed hosting provider, managed colocation provider, etc.)

The cloud enabled application 30 may refer to applications that, like the customer and partner application 20 and the legacy application 25, can run on and be managed by some combination of customers, partners, the organization itself, and/or service providers. The cloud enabled application 30 may include a distributed architecture that can be run on some combination of cloud services (e.g. IAAS, PAAS, SAAS, web services, etc.). The cloud enabled application 30 may be self-contained in that it can utilize its own method of connecting its resources and services or it may make use of the HCIF 10 to connect its resources and services.

The legacy infrastructure 35 can refer to standard IT infrastructure (e.g. computer servers, networking equipment, and data storage devices) that may or may not be managed by infrastructure managers (e.g. HP Systems Insight Manager, Cisco Router and Security Device Manager, Tivoli Storage Manager, etc.) The connection to the legacy infrastructure 35 may be direct to resources and services or via programmatic connection via an infrastructure manager.

The private cloud service 40 can refer to a pool of shared infrastructure resources (e.g. virtual machines (VMs), operating system containers, virtual and/or physical data storage pools, virtual and/or physical communications networks, etc.) located within an organization's premises or at a service provider's premises. These pools of shared infrastructure can offer programmatic or user interface based access, typically via API, CU script or other methods, for administrators, software developers, and others to utilize these resource pools.

The infrastructure as a service (IAAS) 45 can refer to a multitenant public, virtual private, and/or private cloud service provider's Infrastructure services. Examples of these types of services are IBM Bluemix bare metal cloud servers, Amazon AWS EC2 virtual machines (VMs), Amazon AWS S3 elastic block storage, Docker containers, Google Cloud Platform Firewalls, etc.

The platform as a service (PAAS) 50 can refer to a multitenant public or virtual private cloud service provider's platform services. Platform services could be built and managed within an organization as well. Examples of these types of services are Amazon AWS DynamoDB, Heroku, Cloud Foundry, Microsoft Azure Cortana Analytics suite, etc.

The software as a service (SAAS) 55 can refer to a software platform fully managed by an independent software vendor and accessed by users, administrators, and/or developers over the Internet via API (or some other programmatic access) or graphical user interface (GUI). Examples of SAAS 55 services are those provided by vendors such as Salesforce, Workday, and the like.

The web service 60 can refer to a piece of software available over the Internet and available via APIs implemented with XML, WSDL, SOAP or other structured messaging system. Similar to the SAAS 55, the exception may be that the web service 60 is not a complete software application, but still provides a specific function or set of functions. An example of a web service 60 is the Google maps API, as well as other technology platforms developed by companies such as Facebook, Netflix, IBM, etc.

The mobile device 65 can refer to connection to software applications running on mobile devices (e.g. smart phones, tablets, wearable devices, etc.) or software platforms that interact with mobile devices. Although not required, this may be accomplished by API access to back end mobile application platforms which can be hosted on premise, on IAAS services, as a full-fledged PAAS or some combination therewith. Examples of mobile application platforms and developer packages are Apple Swift, Android, iOS SDK, Appcelerator, MobileFrame, etc.

The Internet of Things (IOT) device 70 can refer to programmatic connection to devices or to a software platform that connects to devices other than traditional Internet connected devices. Examples of these devices are microcontrollers that control appliances like refrigerators, computers that control automobiles, trains and other vehicles, industrial control systems (e.g. SCADA systems, programmable logic controllers, etc.), microcontroller controlled industrial devices (e.g. gas turbines, jet engines, drills, etc.) and many other devices. Connections can be directly to IOT devices or via IOT integration platforms. Many software and platform vendors such as General Electric and Amazon Web Services are developing or have developed such IOT platforms. Examples of IOT integration platforms are GE's Predix cloud, Amazon AWS IOT, etc.

The service management system 80 can refer to programmatic connection to one or more IT service management software applications. The HCIF 10 may provide data and/or control integration between each of multiple service management system 80 as well as connection to IT components in various locations managed by one or more service management system 80. The service management system 80 is a software application that may handle processes for managing an entire organization's IT capabilities and can be delivered in a traditional client server architecture on-premise or hosted at a service provider, or as a SAAS. Typical functions of the service management system 80 of FIG. 1 may include but are not limited to managing user permissions, security management, change management (e.g. provisioning and de-provisioning various IT resources), incident management (help desk), capacity management, application and resource monitoring, API management, service level compliance and management, billing and chargeback, configuration management, service communications, etc. Service management application 80 examples include ServiceNow, HP Service Manager, CA Service Desk, New Relic, Openstack, VMware vCloud Suite, Mulesoft, etc. The service management system 80 may also comprise or include an integration manager, service bus, data exchange, etc. Examples include TIBCO ActiveMatrix, IBM Integration Bus, etc.

Figure 2:
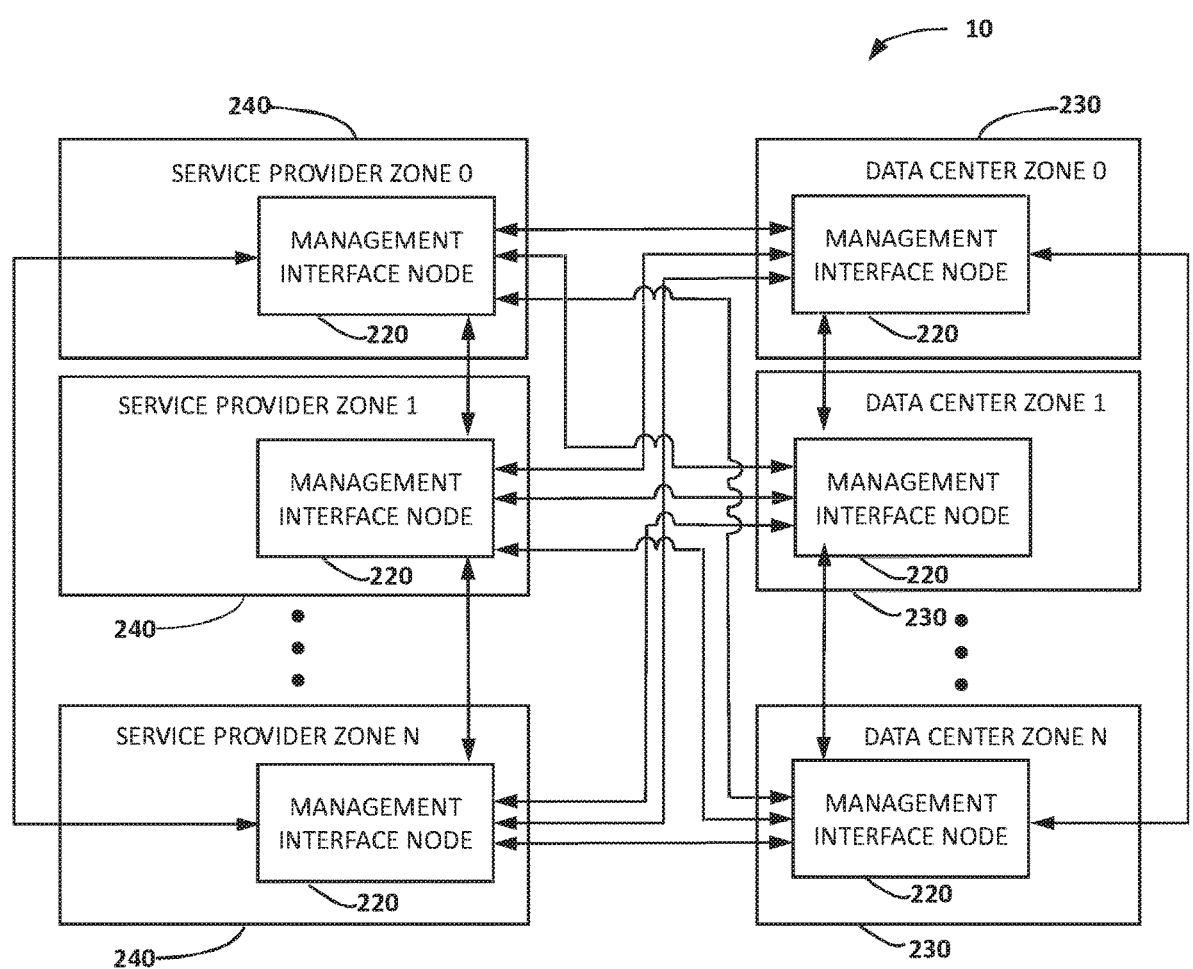
FIG. 2 is a block diagram illustrating an example configuration of a hybrid cloud integration fabric according to one or more example embodiments.

FIG. 2 is a block diagram depicting the top-level architecture of the hybrid cloud integration fabric (HCIF) 10 according to an example embodiment. As can be seen from FIG. 2, in some embodiments, the HCIF 10 includes at least one management interface node 220 located in at least one data center zone 230 and/or at least one service provider zone 240. The HCIF 10 may have one or more management interface nodes 220 in either one or more data center zone 230 instances, one or more service provider zone 240 instances, or both one or more of instances of data center zone 230 and one or more instances of service provider zone 240. In some example embodiments, this configuration may provide the flexibility required to support a vast array of possible configurations.

The at least one data center zone 230 and the at least one service provider zone 240 may be programmatically assigned to particular services and resources. Once assigned, the HCIF 10 may identify the assigned zones as needed during execution. In some instances the at least one management interface node 220 located within the at least one data center zone 230 and the at least one service provider zone 240 may be customized to communicate with the particularly assigned services and resources. In some cases, the at least one management interface node 220 may be assigned to a particular data center zone 230 based on metadata stored within the HCIF 10. In some embodiments, the metadata, and, therefore, the assignments, may be changed programmatically.

The management interface node 220 can correspond to a software component that, when implemented as a single to N way interconnected network, can implement the HCIF 10 according to an example embodiment. In some embodiments, each management interface node 220 of the HCIF 10 can be connected to each other management interface node 220. In some embodiments, each management interface node 220 may not be connected to every other management interface node 220.

In some embodiments, the management interface node 220 can function to programmatically store data and metadata regarding all the various IT resources and services that form the hybrid cloud 01. This metadata can facilitate management of an entire hybrid cloud 01 from a single distributed data repository and allows users, administrators, developers, and software applications to view a hybrid cloud state at any point in time, for example, a past state, the present state, or the state during a prescribed time range. Thus, it may be easier to perform tasks such as troubleshoot problems, calculate usage for billing and chargeback, report service levels, manage capacity, integrate service desk applications, etc. To ease application integration challenges, the management interface node 220 may also store data payloads and executable software components associated with particular software applications, services, methods, processes and the like. In some embodiments, the management interface node 220 can be configured and controlled via a standardized API and may be configured via a GUI as well.

In addition to metadata and data and executable payload storage, the management interface node 220 may also function to communicate with each other management interface node 220 and translate data structures, application program interfaces (APIs), communication protocols, and other data, metadata, or communications methods into other forms for consumption by each other management interface node 220, as well as other connected IT resources and services. Additionally, the management interface node 220 may have the capacity to execute computer programs that perform data translation and/or transformation tasks as well as perform system management tasks (e.g. provision, de-provision, auto-scale, register errors, manage security requirements, etc.), coordinate application data flows, and/or perform other tasks.

The data center zone 230 can represent at least one location for the management interface node 220. In some embodiments, a management interface node 220 can be instantiated on physical and/or virtual IT infrastructure (e.g. servers, data storage, computer networks, private clouds, etc.) within an organization's on-premise facilities (data center) as may be represented by the data center zone 230. The data center zone 230 could encompass services and/or resources (e.g. virtual machines (VMs), operating system containers, virtual and/or physical data storage pools, virtual and/or physical communications network devices, application interfaces, etc.) housed in an entire physical premise, multiple physical premises, or part of a physical premises. In some embodiments, the data center zone 230 could represent a location within a co-location provider's premises or other type of service provider's premises (e.g. managed hosting). Within the data center zone 230 there may be some set of IT services and/or resources that are located near one another (i.e. with relative low latency between resource or and/or service endpoints). Nearness can be relative, and various embodiments could define nearness quite differently based on application requirements.

Much like the data center zone 230, the service provider zone 240 can represent at least one location for the management interface node 220. In some embodiments, the service provider zone 240 may include sets of resources and services located at a cloud service provider (e.g. Amazon AWS, Google Cloud, IBM Bluemix, Microsoft Azure, etc.). While not a requirement for all environments (e.g. where the service provider footprint is sufficiently small), each service provider may have at least one management interface node 220, although other embodiments are possible.

In some embodiments, all resources and services contained within a service provider zone 240 or a data center zone 230 may be associated with a unique data reference identifier, enumerated as a data center group id 550, as discussed below with reference to FIG. 5

Figure 3:
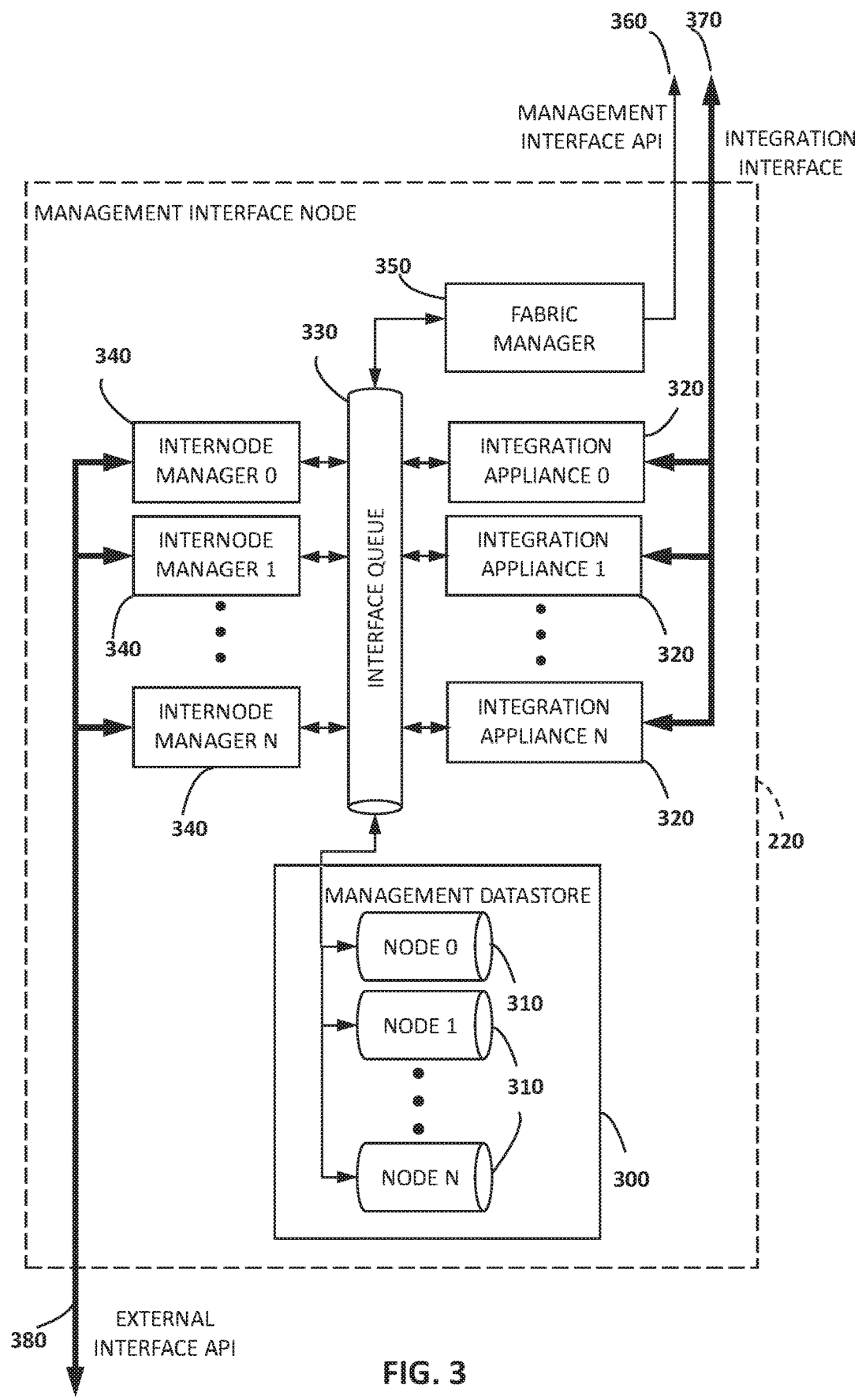
FIG. 3 is a block diagram illustrating an example management interface node for the hybrid cloud integration fabric according to one or more example embodiments.

FIG. 3 is block diagram depicting the internal architecture for the management interface node 220 according to an example embodiment. Referring to FIG. 3, the management interface node 220 may include a management data store 300, at least one integration appliance 320 (as an example of an execution engine), an interface queue 330, at least one internode manager 340, and a fabric manager 350. For data communications, the management interface node 220 may have an integration interface 370 to communicate with resources and services within the data center zone 230 or service provider zone 240 as well as external resources and services (e.g. the legacy application 25, the cloud enabled application 30, the SAAS 55 service, etc. for FIG. 1), a management interface API 360, and an external interface API 380 for communication with other management interface nodes 220. In some embodiments, the management interface node 220 may have a subset of the components illustrated in FIG. 3.

In more detail, the management data store 300 may include at least one node 310 of a database cluster. In some embodiments, the database structure may include key value pairs utilizing industry standard NoSQL database technology that has some method for achieving database consistency, availability, security, load management and archive. In some embodiments, the database technology may have a fixed table schema or a dynamic table schema, for flexibility. There are many types of NoSQL technologies that can be utilized, as non-limiting examples, Redis, Cassandra and Riak are three common key value or columnar database management system (DBMS) examples. In other embodiments, other types of databases, such as relational databases, graph databases, etc., could be utilized. In some embodiments, any type of standard physical or virtual storage, network and computer devices can be utilized to underlie the management data store 300.

The management data store 300 of FIG. 3 may be constructed of N nodes 310 to create linear scaling, to billions of objects or higher to support the Internet of Things (IOT) and other emerging massively scaling IT use cases. Additionally, a cluster configuration for the management data store 300 can provide for a highly resilient architecture. In some embodiments, the management data store 300 can be federated with each management data store 300 in every other management interface node 220 within every HCIF 10. In some embodiments, multiple HCIFs 10 may be federated together.

Connecting the management data store 300 to the other components of the management interface node 220 may be the interface queue 330. Many industry standard message queuing technologies are available to implement the interface queue 330. Common examples include RabbitMQ, Amazon Simple Queue Service, IBM Websphere MQ, AMQP and others. The interface queue 330 may also be functionality included within the database technology platform used by the management data store 300.

The interface queue 330 may arbitrate requests from the fabric manager 350, each integration appliance 320, and each internode manager 340 within the management interface node 220 and can provide for high speed efficient communication between the components of the management interface node 220. In some embodiments, a prioritization algorithm can be set by the fabric manager 350 to be implemented by the interface queue 330, but in other embodiments, the interface queue may handle request prioritization directly. Prioritization could be handled via round robin arbitration, weighted round robin arbitration, interrupt based, first in first out (FIFO), some combination of these methods or via some other arbitration method. While in some embodiments the interface queue 330 may have a single data path, other embodiments may include multiple data paths within the interface queue 330 (e.g. separate data paths for command and control and data).

The fabric manager 350 may be the primary execution engine of the management interface node 220 and can function to control the configuration of the management data store 300, each N integration appliance 320, the interface queue 330, and each N internode manager 340. The fabric manager 350 may be instantiated as a single execution engine or as multiple microservices.

In addition to control of components within the management interface node 220, the fabric manager 350 can manage security (e.g. encryptions settings, identity management, authentication methods, firewall configuration settings, etc.). This may be accomplished through connection via the management interface API 360 to security services (e.g. Microsoft Active Directory, Apache Directory, Splunk, RSA two factor authentication, etc.) and security devices (e.g. physical or virtual firewalls, virtual gateways, web application firewalls, log managers, etc.). Security information may (or may not depending on policy) be stored, and may be encrypted by the fabric manager 350 in the management data store 300. The fabric manager 350 also may provide the capability for audit of data in the management data store 300 for changes or updates to security, configuration, or other data using blockchain and/or quantum cryptography or another method. Information audit and other tasks may also be delegated to other components of the management interface node 220, for example, the integration appliance 320 and/or the internode manager 340.

In addition, the fabric manager 350 may also manage monitoring and uptime alerting and may provide methods for troubleshooting faults with integration into IT service management software or as a standalone capability. The fabric manager may also perform the task of load balancing the objects within the management interface node 220 to optimize latency between the metadata stored in the management data store 300 and resources and services for cost, resiliency, performance and a host of other policies associated with various applications and application operating groups.

The management API 360 may be the primary programmatic control mechanism for the fabric manager 350 and by extension the management interface node 220. It may include a stateless implementation of a standard messaging protocol (e.g. REST, SOAP, JSON, etc.) or set of protocols and may contain functions as necessary to implement the operation of the fabric manager 350. In some circumstance, some procedure calls of the management API 360 may be stateful.

In some embodiments, the integration appliance 320 may include a data and an execution component, and may be the key translation, control, data flow and policy management engine for resources and services (e.g. the legacy application 25, the cloud enabled application 30, the SAAS 55 service, etc.) connected to the management interface node 220.

As an example of an application integration process, in some embodiments, the integration engine 320 may make and/or receive API calls or messages from a data streaming service from an external service (e.g. the legacy application 25, the cloud enabled application 30, the SAAS 55 service, etc.) connected via the integration interface 370, translate the data payload (e.g. JSON, xml) and combine it with data from other API calls and/or data stored in the management data store 300. Based on the state of a state machine implemented in the integration appliance 320, the integration engine 320 may create a new set of API requests or responses to the original external service, other external services, and/or to resources and services identified by the data center group id 550, discussed below with reference to FIG. 5. In some embodiments, the integration process may be programmed via the standardized data structure and execution facilities provided by a data model 400.

In addition to providing application integration facilities to internal and external resources and services, the integration appliance 320 may provide service management facilities (e.g. monitoring, load balancing, billing, service level monitoring and management, etc. of infrastructure, application and middleware components) as well as security facilities. In an example embodiment, the integration appliance 320 can manage two factor authentication of a secure socket connection to an IT service connected via the internal interface through an organization's external firewall. The integration appliance 320 could request changes to firewall settings based on policies recorded in the management data store 300 and/or in a connected security service (e.g. security policies recorded in an IT service management software package installed elsewhere).

The integration appliance 320 may be implemented via a standard data processing engine utilizing Hadoop's data processing facilities (e.g. Map Reduce), Apache Spark data processing libraries (e.g. MLib. GraphX, etc.), IBM Watson API or other 3 party developed processing facility. In some embodiments, the integration requirements may dictate that the integration appliance 320 is built utilizing unique purpose built (custom) software.

The integration appliance 320 may also communicate with resources and services both within and beyond the data center group id 550 via the integration interface 370, which may be a generic connection to an organizations' internal communications network. The integration appliance 320 may also communicate to other resources and services though the interface queue 330, the internode manager 340, and the external interface 380 as connected to a plurality of each management interface node 220 within each location denoted by the remote data center group id 550.

In some embodiments, the internode manager 340 may include a data and an execution component (like the integration appliance 320) and may serve as the communications management engine between each management interface node 220 residing in each other management interface node 220 in locations denoted by the data center group id 550. Each connection between each management interface node 220 may have one internode manager 340 associated to the connection within each management interface node 220 (a total of two internode managers 340 per connection). In some embodiments, as scalability requires, the internode manager 340 may handle multiple connections to other management interface node 220 in locations denoted by the data center group id 550 or each internode manager 340 may handle a single connection. The internode manager 340 functionality may also be performed by another component of the management interface node 220. In an example embodiment, Apache Cassandra may perform most or all the functions of the management data store 300, the interface queue 330 and the internode manager 340.

In some embodiments, the internode manager 340 can manage connection sessions, authentication encryption, compression and deduplication of data flows, moves application, configuration, and policy data between each management data store 300 residing in each different management interface node 220 and application, configuration, and policy data from all sources located within or connected to the HCIF 10. The internode manager may also control configuration of the physical and/or virtual network connections between each different management interface node 220 denoted by each data center group id 550.

The internode manager 340 may implement the external interface API 380, which may be the programmatic method by which different management interface nodes 220 communicate with each other.

The external interface API 380 may be the primary programmatic control mechanism for the communication between different management interface nodes 220 within the HCIF 10. It may include a stateless implementation of a standard messaging protocol, set of protocols, and/or formats (e.g. REST, SOAP, SON, etc.) and contains functions as necessary to implement the operation of internode manager 340. In some circumstances, some calls of the external interface API 380 may be stateful.

Figure 4:
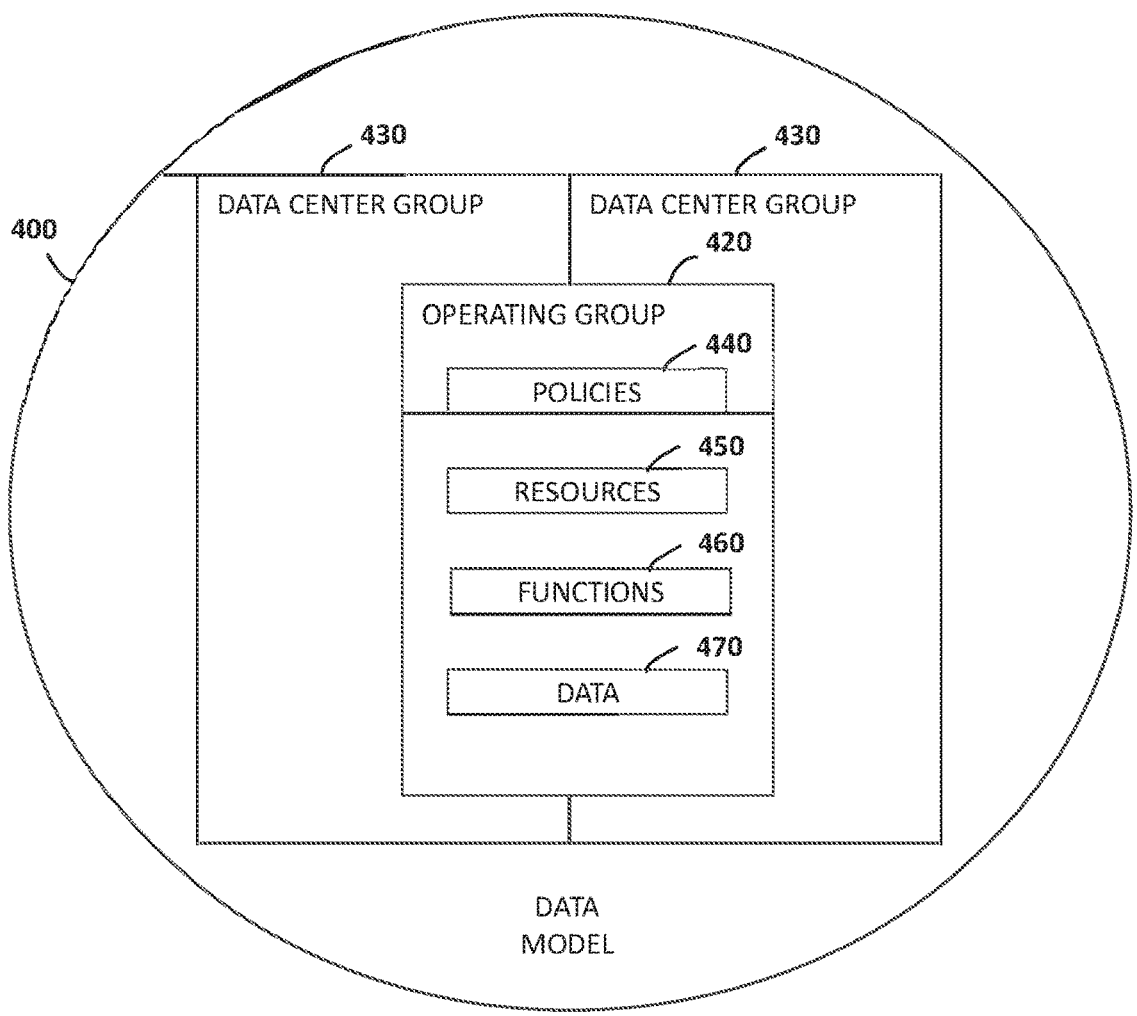
FIG. 4 is a relational diagram showing example types of data within a data model for the hybrid cloud integration fabric according to one or more example embodiments.

FIG. 4 is a relational block diagram detailing a data model 400 as an ontological component. In some embodiments, the data model 400 may contain the data, software execution code, configurations and policies required to operate the HCIF 10 as well as for an unlimited number of software applications and other IT systems contained within the hybrid cloud 01.

Types of data described by the data model 400 may include a category for an operating group 420, including relational information specifying resources 450, policies 440, data 470 and other objects associated with a software application or group of software applications, a data center group 430, consisting of references to objects' location specific data. The operating group 420 may include data structures including data nodes for policies 440, including control and other policies relating to various constructs within and associated with components of the hybrid cloud 01, resources 450, including state, attribute, configuration and other information relating to physical and/or virtual objects associated with the hybrid cloud 01, functions 460, including executable programs related to operational and other tasks within the hybrid cloud 01, and data 470, including data consumed by or operated on by other elements of the data model 400. In one embodiment, an instance of an operating group 420 may be stored in one or more management data store 300 and contain all the policies 440, resources 450, functions 460, and data 470 required to operate a management interface node 220. To insure maximum flexibility, any object within the data model 400 may refer to any set or sub set of other objects that exist within the HCIF 10 or even the entire hybrid cloud 01.

In some embodiments, an operating group 420 refers to a logical concept that groups into a single entity functions 460, policies 440, resources 450, and data 470 as part of software programs, physical and virtual infrastructure and data. An operating group 420 may contain all objects in the management data store 300 associated with a system, process, method, part of an application (software program), an entire application, or group of additional software applications. Additionally, operating groups 420 may reside in a single service provider zone 240 or data center zone 230 or in a plurality of service provider zones 240 and/or data center zones 230. Objects contained within an operating group 420 may or may not belong to other operating groups 420. Operating groups 420 may also contain data referencing and/or interacting with external resources and services in the hybrid cloud 01.

Data types (e.g. policies 440, functions 460) described by the data model 400 can map to specific data structures, or nodes, within the tables in a database instantiated in each management data store 300. The mapping may or may not be linear, and each database node can contain zero, or one or more, of each data type. As an example, an operating group 420 may contain polices 440 and resources 450 shared with another operating group 420. Both operating groups 420 may reside in one, two or more data center groups 430. Any or all the objects within the data model 400 may have security access control, encryption and other controls applied as part of an internal security architecture and/or an external security service.

Figure 5:
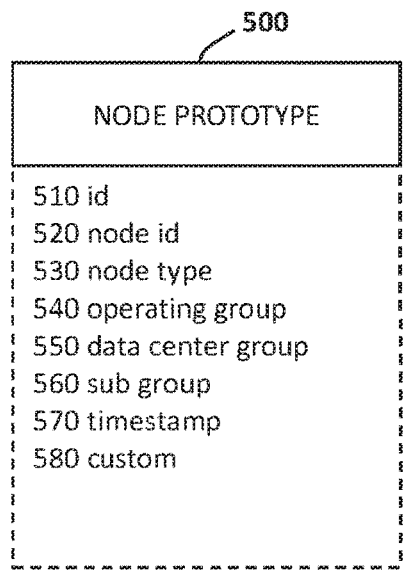
FIG. 5 is a diagram that shows an example data structure node prototype for the data model according to one or more example embodiments.

FIG. 5 is diagram listing common components of data nodes (or objects) classified as policies 440, resources 450, functions 460, and/or data 470 within the data model 400. Any specific object or node as part of the data model 400 may contain most or all of these components as well as many additional components as needed to achieve their purpose.

A node prototype 500 as shown in FIG. 5 consists of data objects that exist across most or all data node types within the data model 400. In some embodiments, the list of objects may include an id 510, a node id 520, a node type 530, an operating group 540, a data center group 550, a sub group 560, a timestamp 570 and one or more custom 580 objects. The id 510 may include a value that uniquely identifies a point in time entry in the management data store 300 and corresponds to a node id 520. A point in time entry is data or metadata stored with a timestamp. If the data is later updated, such update may be done as another point in time entry. Using point in to entries, a time view of how the data has changed overtime may be generated. The node id 520 may include a value that uniquely identifies a unique data node within a data center group 550 and one or more instances of operating group 540. The node id 520 may uniquely identify the data node across the entire HCIF 10 as well and may be represented as a uuid or similar unique identifier. The node type 530 may identify all data nodes within the data model 400 as elements of a class of objects in various software applications and/or configurations. A large number of types of data nodes may be referenced by the node type 530. The operating group 540 is a data object that identifies a data node as a member of a particular operating group 420. A data node may have a plurality of operating groups 540. The data center group 550 may identify the data node as belonging to a specific data center zone 230 or a specific service provider zone 240. A data node may have a plurality of a data center group 550. The sub group 560 object may identify the data node as a member of a grouping with an operating group 420. Groupings (e.g. database tables) within an operating group 420 are not necessary, but some embodiments may choose to group data nodes with a similar data type (e.g. policies 440, resources 450, etc.) into database tables or other data constructs.

The timestamp 570 may be a reference identifier that corresponds to the time that a particular data node is updated. In some example embodiments, a timestamp may be updated any time a data node is accessed (read or written). The custom 580 object can be defined as any digitally storable data object and may exist in zero data nodes, a single data node or in a plurality of data nodes. The custom 580 object may or may not also be unique to each data node it is instantiated within. In addition, all data nodes within the data model 400 may contain one or more custom 580 key value objects.

The timestamp 570 data object may provide a method for multiversion concurrency control (MVCC) that, in addition to other functions, provides for consistent views for any particular point in time, and provides a method for tracking changes and audit. In some embodiments, the data structure of a data node may not be modifiable. Instead, to update a data node, the data node (e.g. resource nodes 450, operating groups 420, etc.) may be copied, a current timestamp 570 be applied and the entire node be stored in a new entry in the management data store 300 or elsewhere. In some embodiments, no data node entry is deleted from the management data store 300, although an archive mechanism may exist that moves old data node entries out of the management data store 300 to an archive.

In some embodiments, the timestamp 570 functionalities may provide the ability to view the entire state of all resources, policies, services and other entities associated with and/or managed by the HCIF 10 both at the current time and at any historical point in time since the objects were first referenced within the management data store 300. This functionality may greatly aid in troubleshooting, billing, chargeback billing, invoicing, service level reporting, incident monitoring and reporting, capacity management, scenario analysis, application design, predictive analytics, audit and a host of other operational and analytical tasks. In addition to timestamps, updates to data nodes may be tracked via blockchain or other auditing mechanism. Blockchain records may be stored within the management data store 300 or elsewhere. The use of blockchain algorithms for audit of IT systems may increase security and reliability of the audit.

Figure 6:
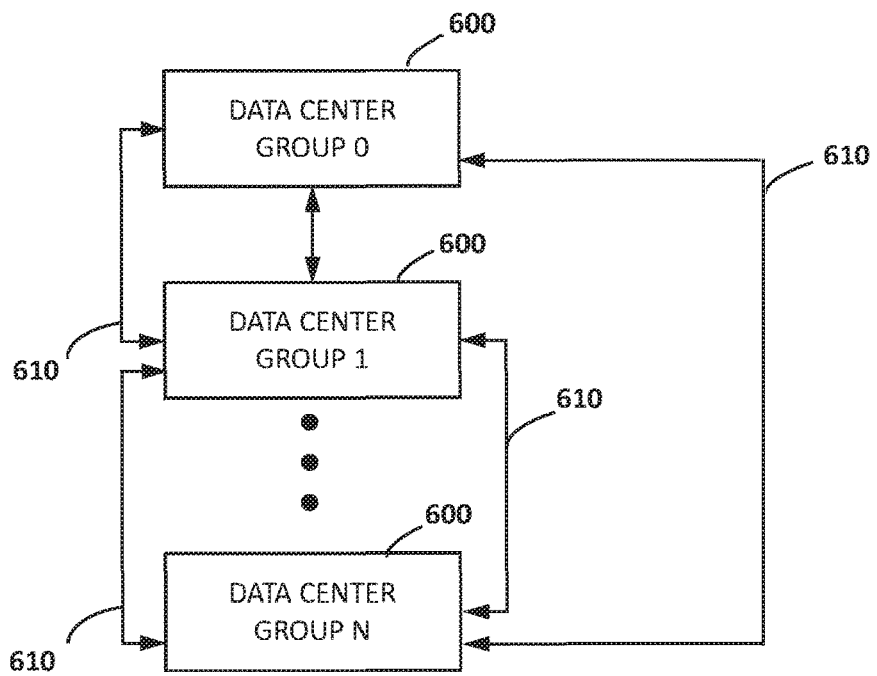
FIG. 6 is a block diagram showing an example of how different data center group data constructs for the data model relate to each other according to one or more example embodiments.

FIG. 6 is a block diagram that illustrates connectivity and how costs, bandwidth and performance are associated with logical relationships within the HCIF 10. Policies may then be applied to determine suitability for change processes such as provisioning and deprovisioning of software applications, load balancing of workloads, and others. Shown in FIG. 6 is a data center group 600 which may correspond to a management interface node 220 within the service provider zone 240 or data center zone 230, and may correspond to the data center group 430. The data center group 600 reference identifier may be stored in data nodes in the data center group 550 object as described within the node prototype 500.

Between each data center group 600 in the HCIF 10 may exist at least one connection, an external network connection 610 upon which the external interface API 380 may communicate. In some embodiments, each data group 600 may not have a connection to every other data group 600. The external network connection 610 can be implemented upon any standard physical or virtual data network technology.

Each external network connection 610 has costs, available bandwidth, peak and average latency and other associated attributes, which may be stored in data nodes within the data model 400.

Figure 7:
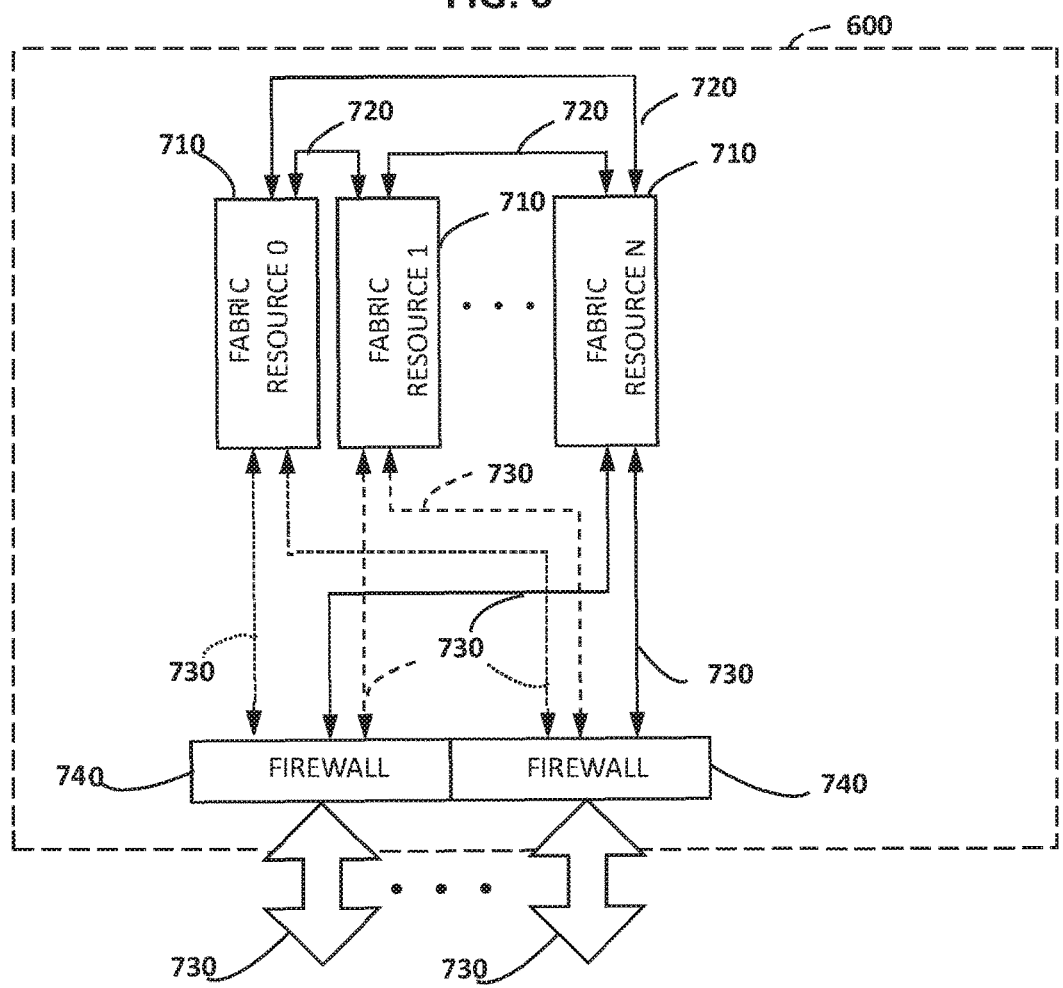
FIG. 7 is a block diagram showing an example of how network related data constructs within the management interface node relate to each other according to one or more example embodiments.

FIG. 7 is a block diagram of a data center group 600 that further illustrates an example of how costs, latency and bandwidth could be calculated for objects associated with each operating group 420. Within each data center group 600 may exist one or more a fabric resource 710 that may refer to resources within the data center group 600 (e.g. virtual machines (VMs), operating system containers, virtual and/or physical data storage pools, virtual and/or physical communications network devices, application interfaces, etc.) that may be components of any management interface node 220 and/or may be utilized by applications referred to by operating groups denoted by one or more of each operating group 540 object in the data model 400 of FIG. 4. One or more data nodes may refer to each fabric resource 710 and be stored as data type resources 450 in the management data store 300.

As an example, each fabric resource 710 may have a relative latency and cost 720 associated with the network connection between each fabric resource 710 and each other fabric resource 710. Each relative latency and cost 720 may be referenceable to connections via integration interface 370 as well as direct connections between each fabric resource 710. Each relative latency and cost 720 attribute may be stored in the data nodes of data type resources 450 or other data type.

Similarly, a relative external latency and cost 730 may be associated with network connections between each fabric resource 710 and a firewall 740 or other external interface device that provides a gateway to wide area network connections to both external services (e.g. mobile device 65. SAAS 55 service, IAAS 45 service, etc.) and each fabric resource 710 in the same operating group (for example, the operating group 540 object) in a remote data center group 600. The relative external latency and cost 730 may be referenceable to connections via the integration interface 370 and/or the network connections underlying the external interface API 380. Each relative external latency and cost 730 attribute may be stored in the data nodes of data type resources 450 or other data type.

In some embodiments, the firewall 740 may serve as an example of a gateway to wide area network connections to resources and services outside the local data center group 600. There may be one or more firewall 740 devices in various embodiments and firewall 740 devices may be connected in a hierarchical manner (i.e. one firewall 740 connected to one or more firewall 740 devices in an N tier network architecture). In some embodiments, the firewall 740 device may represent a physical or virtual firewall, edge gateway, router or other network node. There may be one or more relative external latency and cost 730 attributes for each connection between each fabric resource 710 within the local data center group 600 and resources and services in each remote data center group 600 as well as outside the HCIF 10, related to connections to resources and services in the hybrid cloud 01.

For example, to calculate latency (peak and average) between resources for an operating group 420 within the data model 400 via an execution module stored as a function 460, each latency component for each relative external latency and cost 730 attribute and relative latency and cost 720 for all paths utilized between components of the operating group may be added. In one of the simplest embodiments, the latency for the operating group is then the maximum latency as calculated by all the paths utilized between all the components of the operating group. In some embodiments, the operating group may be composed of multiple services and processes. For each service and/or process, a latency can be calculated and stored as an attribute in the data model 400. In some embodiments, policies may be defined and stored in data nodes with data type policy 440 that governs changes that may occur when latency attributes exceed a threshold policy.

In another example, to calculate costs, attributes associated with resources and services may be stored in data nodes of data type resource 450 in the data model 400 and, when combined with state information (e.g. power on/off, suspend, etc.) and policy information relating to costs, costs associated with each component of an operating group may be calculated and may be stored in the data model 400. Network costs may be calculated (typically associated with bandwidth) by adding the cost attributes of the relative external latency and cost 730 attribute and relative latency and cost 720 for each network connection. In some cases, the network costs associated may already account for costs associated with network resource nodes (as may be denoted by the resource nodes 450 in the data model 400). In this case the related relative external latency and cost 730 attribute and relative latency and cost 720 may be zero. In some embodiments, policies can be defined that govern changes that may occur when cost attributes exceed a threshold (also an attribute). In the example cost and latency calculations, the calculations may be executed by any execution engine with a management interface node 220 and/or an external service (ex. billing software package).

Like latency and cost calculations, service level metrics, monitoring, violations, and penalties may be calculated via software programs stored in various data nodes of type function 460 within the data model 400 that operate on policies, attributes and state data stored in various data nodes within the data model 400. For example, automation of service level metrics collection, monitoring, violation notifications and calculations penalties for all services and resource components for all operating groups managed by or accessed by the HCIF 10 may be possible. External services may also be utilized for these calculations in place of or in conjunction with functions in this embodiment.

Figure 8:
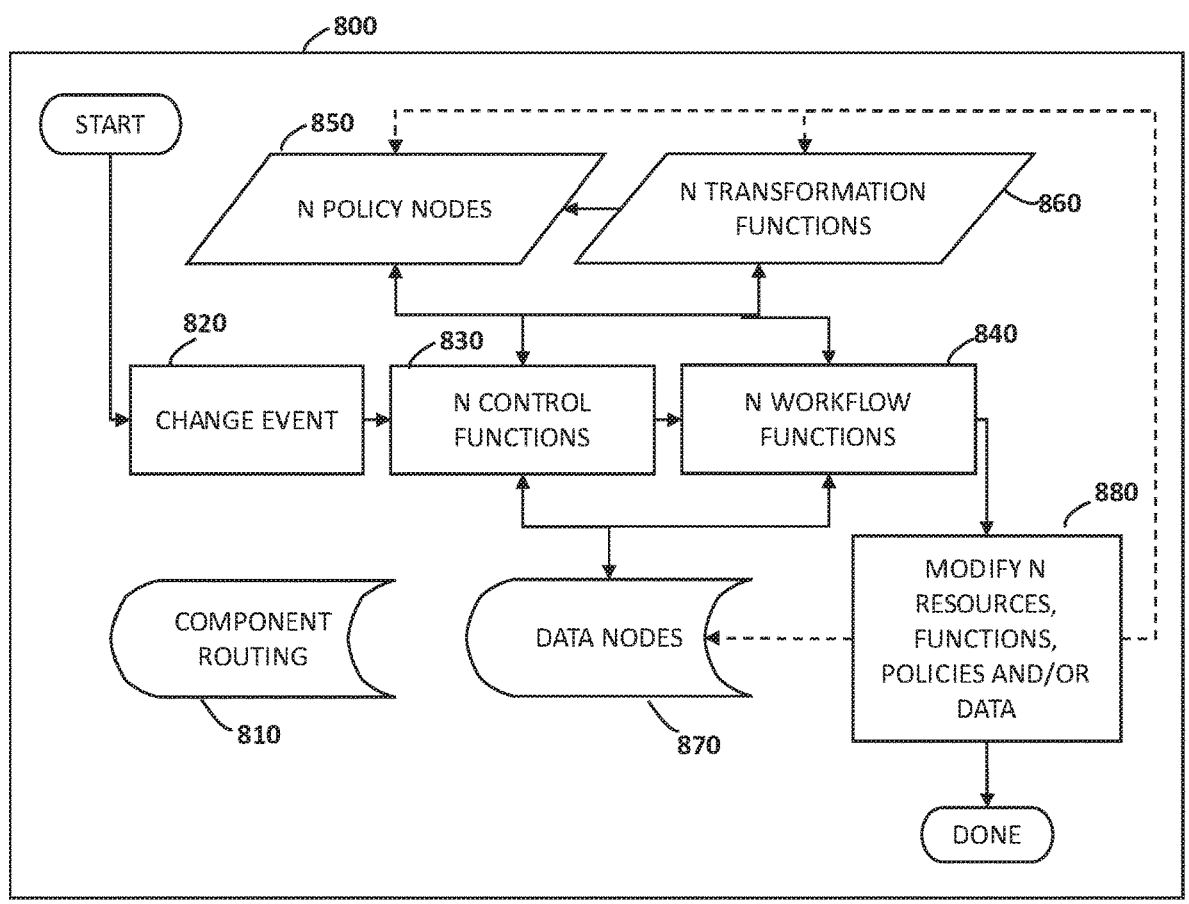
FIG. 8 is a process flow diagram showing an example process that shows how elements can be connected in various ways to process data to achieve a result according to embodiments.

FIG. 8 is a process flow diagram that depicts a programming model 800 according to an example embodiment. Within the programming model 800 may be a component routing 810 data object, a change event 820 initiation process step, an N control function 830 component category, an N workflow function 840 component category, a policy node 850 component category, an N transformation function 860 component category, a data node 870 component category, and a modify N resources, functions, policies and/or data 880 process step. All the components of the programming model 800 may be stored in and utilize the data model 400 and in turn operate on the infrastructure described in FIG. 2 and FIG. 3. In addition, some embodiments of the programming model 800 may include more or fewer components.

In some embodiments, the component routing 810 data object contains one or more data objects that document the references to or connections of all the other components within the programming model 800, making it dynamically configurable. In addition, other components of the programming model may consume and/or operate on routing information contained in the component routing 810 data objects. The routing or connection of components depicted in FIG. 8 serves as an example only. The use of component routing 810 data objects makes dynamic configuration and reconfiguration of policies, functions, resources and data not only possible, but in many instances preferred. As an example, a software application as described by an operating group 420 may detect a change in resource attributes and move components from one location described by one data center group 430 to another described by a second data center group 430. That change may require the use of a different set of APIs and the component routing 420 data could then be updated to utilize a different configuration of components in order to deploy on the new location enumerated by the second data center group 420. The component routing 810 data objects could be stored in data nodes of data type policies 440 in the data model 400 or elsewhere.

The software processes governed by the programming model 800 may be initiated by the change event 820. Example change event 820 initiation types may include scheduled events, change in a state input variable, a service level metric exceeding a threshold, a change in available existing service and/or resource (i.e. cost, performance, latency, availability, etc.) availability of a new service or resource, a policy change and/or creation of a new policy, change in configuration of an object within the HCIF 10, a user initiated event and others. Execution may occur internally and/or with an external service.

The N control functions 830, N workflow functions 840, and N transformation functions 860 objects refer to zero, one, or a plurality of data nodes as described by the functions 460 data type of the data model 400 and, in some example embodiments, may contain execution code related to program control, workflows, and data and/or metadata transformations respectively. In some example embodiments, functions 460 may have other classification systems applied. The N policy nodes 850 object refers to zero, one, or a plurality of data nodes as described by the policies 440 data type of the data model 400 and contain policies that are referenced by or operate on other components of the programming model 800. The data nodes 870 object refers to zero, one, or a plurality of data nodes as described by the data 470 data type of the data model 400 and contain data that is modified, consumed or otherwise used by or operated on other components as well as any connected external IT service. The modify N resources, functions, policies and/or data 880 process step of the programming model 800 represents an arbitrary action or outcome as a result of the example process flow depicted within the programming model 800.

In more detail, the flexible nature of combining policies 440, resources 450, functions 460 and data 470 in variable configurations (as contrasted with traditional programming models that typically have separate or partially separate process flows for programs, data and metadata) may provide for many useful programming constructs which may be realized by the programming model 800. As a detailed example, a change process as depicted by the programming model 800 may include automated load balancing (including resizing, provisioning and de-provisioning) of resources between each service provider zone, each data center zone and/or external services (e.g. mobile device 65, SAA5 55 service, IAAS 45 service, etc.). This example process may provide the ability for applications in the hybrid cloud 01 to automatically grow and shrink resource pools based on changes in attributes like infrastructure cost and changes in policies (i.e. security, capacity, availability, etc.) across multiple on-premise (e.g. legacy infrastructure 35) and off-premise (e.g. PAAS 50) services, thus optimizing application deployment and management.

In the automated load balancing example, an execution engine (e.g. some software application, a fabric manager 350, integration appliance 320, or internode manager 340 running a control function 830 stored as a data node of data type function 460) may receive the change event 820, and may load relevant policies relating to one or more affected operating groups 420 from the policy nodes 850 data objects as well as resource attributes stored in data nodes 870. In some embodiments, the N policy nodes 830 and data nodes 870 objects may be stored in one or more data nodes in the management data store 300 as one or more of each policies 440 and resources 450 data types respectively. In the automated load balancing example, relevant policy and resource attributes may relate to maximum or minimum cost thresholds, maximum application response time, minimum availability, etc. or other constraints or attributes governing the related operating groups 420.

Once policies and attributes are extracted, the policy model, for the example load balancing process, may be built via one or more N transformation functions 860. The policy model may contain instructions for changes in resources and service components of the hybrid cloud 01 based on a set of state conditions. Enumerated by instruction outputs from the N control functions 830 process, other executable software within the programming model 800 may then compare maximum cost and latency attributes to thresholds, identify additional objects to be accessed and/or create a new optimized application configuration and other policy constraints (e.g. security, redundancy constraints, etc.). In the automated load balancing example, an example instruction may be to calculate maximum cost and latency for objects within an operating group. The operation to add or remove resources as depicted by the modify N resources, functions, policies and/or data 870 process is then implemented by an execution engine (e.g. fabric manager 350, integration appliance 320, internode manager 340, etc. or another application running an N workflow function 840 that is stored as a data node of data type function 460). The execution engine then may update state, configuration, attributes and associated data in the data nodes 870 and component routing 810 as may be stored in the management data store 300.

Additionally, instructions issued to external resources and services (e.g. mobile device 65, SAAS 55 service, IAAS 45 service, etc.) may be required to implement the new solution in the automated load balancing example and may be consumed as inputs and/or outputs to various functions in the programming model 800.

As a result of completing the automated load balancing example process (e.g. completing the modify N resources, functions, policies and/or data 880 process), is an application configuration (e.g. operating group 420) fully optimized based on inputs and with the best possible cost and performance based on security, cost, performance and other policies.

Figure 9:
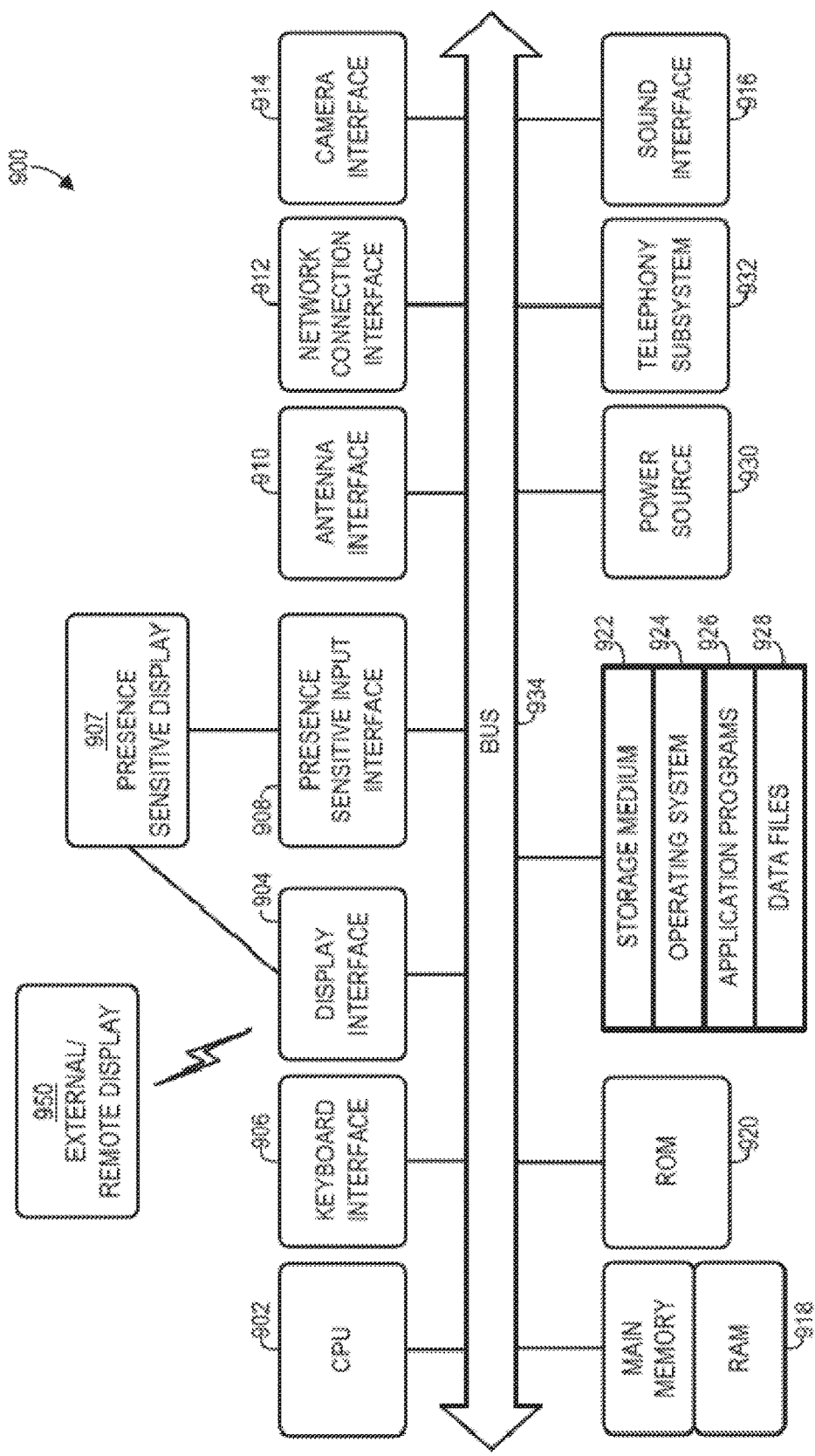
FIG. 9 is a block diagram of an illustrative computer system architecture according to an example implementation.

FIG. 9 depicts a block diagram showing a computer system architecture 900 according to an example embodiment. As desired, embodiments of the disclosed technology can include a mobile computing device, a desktop or a server environment with more or less of the components illustrated in FIG. 9. Embodiments of methods of the disclosed technology may be executed using a computer system architecture 900 including more or less of the components illustrated in FIG. 9. It will be understood that the computing device architecture 900 is provided for example purposes only and does not limit the scope of the various embodiments of the present disclosed systems, methods, and computer-readable mediums. In some embodiments, one or more elements of the hybrid cloud 01, and in particular one or more elements of the HCIF 10, may be implemented using the computer system architecture 900.

The computing device architecture 900 of FIG. 9 includes a CPU 902, where computer instructions are processed; a display interface 906 that acts as a communication interface and provides functions for rendering video, graphics, images, and texts on the display. According to certain some embodiments of the disclosed technology, the display interface 906 can be directly connected to a local display, such as a touch-screen display associated with a mobile computing device. In another example embodiment, the display interface 906 can be configured for providing data, images, and other information for an external/remote display that may not necessarily be physically connected to the mobile computing device. For example, a desktop monitor can be used for mirroring graphics and other information that can be presented on a mobile computing device. According to certain some embodiments, the display interface 906 can wirelessly communicate, for example, via a Wi-Fi channel or other available network connection interface 912 to the external/remote display.

In an example embodiment, the network connection interface 912 can be configured as a communication interface and can provide functions for rendering video, graphics, images, text, other information, or any combination thereof on the display. In one example, a communication interface can include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 900 can include a keyboard interface 904 that provides a communication interface to a keyboard. In one example embodiment, the computing device architecture 900 can include a presence-sensitive display interface 907 for connecting to a presence-sensitive display. According to certain embodiments of the disclosed technology, the presence-sensitive display interface 907 can provide a communication interface to various devices such as a pointing device, a touch screen, a depth camera, etc. which may or may not be associated with a display.

The computing device architecture 900 can be configured to use an input device via one or more of input/output interfaces (for example, the keyboard interface 904, the display interface 906, the presence sensitive display interface 907, network connection interface 912, camera interface 914, sound interface 916, etc.) to allow a user to capture information into the computing device architecture 900. The input device can include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device be integrated with the computing device architecture 900 or may be a separate device. For example, the input device may be an accelerometer, a magnetometer, a digital camera, a microphone, and an optical sensor.

Example embodiments of the computing device architecture 900 may include an antenna interface 910 that provides a communication interface to an antenna; a network connection interface 912 that provides a communication interface to a network. According to certain embodiments, a camera interface 914 is provided that acts as a communication interface and provides functions for capturing digital images from a camera. According to certain embodiments, a sound interface 916 is provided as a communication interface for converting sound into electrical signals using a microphone and for converting electrical signals into sound using a speaker. According to example embodiments, a random access memory (RAM) 918 is provided, where computer instructions and data may be stored in a volatile memory device for processing by the CPU 902.

According to an example embodiment, the computing device architecture 900 includes a read-only memory (ROM) 920 where invariant low-level system code or data for basic system functions such as basic input and output (I/O), startup, or reception of keystrokes from a keyboard are stored in a non-volatile memory device. According to an example embodiment, the computing device architecture 900 includes a storage medium 922 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 924, application programs 926 (including, for example, a web browser application, a widget or gadget engine, scripts, and or other applications, as necessary) and data files 928 are stored. According to an example embodiment, the computing device architecture 900 includes a power source 930 that provides an appropriate alternating current (AC) or direct current (DC) to power components. According to an example embodiment, the computing device architecture 900 includes a telephony subsystem 932 that allows the device 900 to transmit and receive sound over a telephone network. The constituent devices and the CPU 902 communicate with each other over a bus 934.

According to an example embodiment, the CPU 902 has appropriate structure to be a computer processor. In one arrangement, the CPU 902 may include more than one processing unit. The RAM 918 interfaces with the computer bus 934 to provide quick RAM storage to the CPU 902 during the execution of software programs such as the operating system application programs, and device drivers. More specifically, the CPU 902 loads computer-executable process steps from the storage medium 922 or other media into a field of the RAM 918 in order to execute software programs. Data may be stored in the RAM 918, where the data may be accessed by the computer CPU 902 during execution. In one example configuration, the device architecture 900 includes at least 128 MB of RAM, and 256 MB of flash memory.

The storage medium 922 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 922, which may comprise a machine-readable storage medium. Machine-readable storage medium (which may also be referred to herein as "computer storage media", "computer-readable storage medium" or "computer-readable storage media") may include volatile and non-volatile, removable and non-removable media implemented in any method or technology for storage of information, but do not include transitory signals.

According to one example embodiment, the term computing device, as used herein, may be a CPU, or conceptualized as a CPU (for example, the CPU 902 of FIG. 9). In this example embodiment, the computing device may be coupled, connected, and/or in communication with one or more peripheral devices, such as display. In another example embodiment, the term computing device, as used herein, may refer to a mobile computing device, such as a Smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data can be processed by one or more computer processors as desired in various embodiments of the disclosed technology and/or stored in one or more memory devices.

One or more network interfaces can facilitate connection of the computing device inputs and outputs to one or more suitable networks and/or connections; for example, the connections that facilitate communication with any number of sensors associated with the system. The one or more network interfaces can further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems. As desired, embodiments of the present disclosure can include the device computing system architecture with more or less of the components illustrated in FIG. 9.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, method, and examples, but by all embodiments and methods within the scope and spirit of the invention as claimed and their equivalents.

What is claimed is:

1. A method performed by a processor in a hybrid cloud environment, the method comprising:
   translating, by a first management interface node, information from a resource or service to a format understandable by a second management interface node to create first-level translated information, wherein the first-level translated information is associated with metadata selected from the group consisting of:
      policy metadata comprising policy information relating to constructs within and associated with components of the hybrid cloud environment;
      resource metadata comprising state, attribute and configuration information relating to physical and virtual objects associated with the hybrid cloud environment;
      function metadata relating to one or more operational tasks within the hybrid cloud environment; and
      data comprising information consumed and operated on by elements of a data model; and
   transmitting the first-level translated information from the first management interface node to the second management interface node.

2. The method of claim 1, further comprising:
   receiving, by the second management interface node, the first-level translated information;
   translating, by the second management interface node, the first-level translated information to a format understandable by a set of services or resources associated with at least one data center zone to create second-level translated information; and
   transmitting the second-level translated information to the set of services or resources associated with the at least one data center zone.

3. The method of claim 1, further comprising:
   programmatically storing metadata corresponding to all resources and services of the hybrid cloud environment; and
   facilitating management of the hybrid cloud environment based on the stored metadata.

4. The method of claim 3, further comprising:
   optimizing latency between the metadata and the resources and services of the hybrid cloud environment based on application policies.

5. The method of claim 1, wherein:
   the information comprises an instruction from a resource or service associated with at least one service provider zone; and
   the translating by the first management interface node comprises:
      translating the instruction from the resource or service to the format understandable by the second management interface node; and
      combining the translated instruction with additional data to create the first-level translated information.

6. The method of claim 1, further comprising:
   maintaining a connection between the first management interface node and at least one security service and device; and
   managing security of the first management interface node through the connection.

7. The method of claim 1, further comprising:
   receiving, by a change engine, a change event;
   extracting, by the change engine, one or more policies related to the change event and attributes of one or more operating groups impacted by the change event;
   loading, by the change engine, resource attributes;
   building, by the change engine, a policy model;
   generating, by the change engine, an optimized application configuration based on the policy model, attributes of the one or more operating groups, and resource attributes; and
   updating, by the change engine, the one or more policies, attributes, and connections between the one or more operating groups.

8. The method of claim 1, wherein the method further comprises:
   comparing the first level translated information to each threshold of a set of thresholds comprising:
      a policy threshold;
      a resource threshold;
      a function threshold; and
      a data threshold; and
   assigning a metadata identifier to the first level translated information based on which threshold of the set of thresholds is satisfied by the first level translated information, wherein the metadata identifier designates the metadata with which the first level translated information is associated.

9. A computer apparatus comprising:
a processor; and
a memory, having stored thereon computer program code that, when executed by the processor, instructs the processor to implement a hybrid cloud integration fabric (HCIF) within a hybrid cloud environment, wherein the HCIF comprises two or more management interface nodes, wherein:
 each of the two or more management interface nodes is configured to translate information between a resource or service and at least one other management interface node; and
 each of the two or more management interface nodes comprises a management data store, the management data store comprising a plurality of data nodes, wherein each data node comprises metadata selected from the group consisting of:
  policy metadata comprising policy information relating to constructs within and associated with components of the hybrid cloud environment;
  resource metadata comprising state, attribute and configuration information relating to physical and virtual objects associated with the hybrid cloud environment;
  function metadata relating to one or more operational tasks within the hybrid cloud environment; and
  data comprising information consumed and operated on by elements of a data model.

10. The computer apparatus of claim 9, wherein each management interface node is further configured to:
 programmatically store metadata corresponding to all resources and services of the hybrid cloud environment; and
 facilitate management of the hybrid cloud environment.

11. The computer apparatus of claim 9, wherein each management interface node comprises:
 a management data store;
 an integration appliance configured to:
  receive instructions from a resource or service;
  translate the instruction and combine the instruction with additional data; and
  transmit the translated instruction;
 an internode manager configured to manage connections between the management interface node and another management interface node; and
 a fabric manager configured to control configuration of the management interface node.

12. The computer apparatus of claim 11, wherein the fabric manager is configured to manage security of the management interface node through connection with security services and devices.

13. The computer apparatus of claim 11, wherein the fabric manager is configured to optimize latency between metadata stored in the management data store and resources and services based on application policies.

14. A non-transitory computer readable medium having stored thereon computer program code that includes instructions to implement a hybrid cloud integration fabric (HCIF) within a hybrid cloud environment, the HCIF comprising two or more management interface nodes, wherein:
 each of the two or more management interface nodes is configured to translate information between a resource or service and at least one other management interface node; and
 each of the two or more management interface nodes comprises a management data store, the management data store comprising a plurality of data nodes, wherein each data node comprises metadata selected from the group consisting of:
  policy metadata comprising policy information relating to constructs within and associated with components of the hybrid cloud environment;
  resource metadata comprising state, attribute and configuration information relating to physical and virtual objects associated with the hybrid cloud environment;
  function metadata relating to one or more operational tasks within the hybrid cloud environment; and
  data comprising information consumed and operated on by elements of a data model.

15. The non-transitory computer readable medium of claim 14, wherein each management interface node is further configured to:
 programmatically store metadata corresponding to all resources and services of the hybrid cloud environment; and
 facilitate management of the hybrid cloud environment.

16. The non-transitory computer readable medium of claim 14, wherein each management interface node comprises:
 an integration appliance configured to:
  receive instructions from the resource or service;
  translate the instruction and combine the instruction with additional data; and
  transmit the translated instruction;
 an internode manager configured to manage connections between the management interface node and another management interface node; and
 a fabric manager configured to control configuration of the management interface node.

17. The non-transitory computer readable medium of claim 14, wherein the fabric manager is configured to manage security of the management interface node through connection with security services and devices.

18. The non-transitory computer readable medium of claim 14, wherein the fabric manager is configured to optimize latency between the metadata stored in the management data store and resources and services based on application policies.

* * * * *